United States Patent [19]

Sollich

[11] Patent Number: 5,403,396
[45] Date of Patent: Apr. 4, 1995

[54] TEMPERING AND COATING PLANT FOR DIFFERENT MASSES, IN PARTICULAR FOR WHITE AND NON-WHITE CHOCOLATE

[75] Inventor: Helmut Sollich, Rabenkirchen, Germany

[73] Assignee: Sollich GmbH & Co. KG, Bad Salzuflen, Germany

[21] Appl. No.: 36,174

[22] Filed: Mar. 23, 1993

[30] Foreign Application Priority Data

Mar. 27, 1992 [DE] Germany .................... 42 09 966.8

[51] Int. Cl.6 .................................... B05B 3/00
[52] U.S. Cl. .................................. 118/323; 118/16; 118/25; 118/314
[58] Field of Search .................. 118/16, 24, 25, 28, 118/263, 313, 314, 323, DIG. 4; 426/306, 307; 427/420

[56] References Cited

U.S. PATENT DOCUMENTS

| | | | |
|---|---|---|---|
| 2,841,074 | 7/1958 | Schechter | 118/25 |
| 3,958,018 | 5/1976 | Tay | 426/307 |
| 4,473,027 | 9/1984 | Arfert et al. | 426/306 |
| 5,248,341 | 9/1993 | Berry, Jr. et al. | 118/323 |

FOREIGN PATENT DOCUMENTS

| | | | |
|---|---|---|---|
| 2558342 | 7/1985 | France | 118/24 |
| 2452177 | 5/1976 | Germany | |
| 2725181 | 12/1978 | Germany | 118/25 |

OTHER PUBLICATIONS

Zucker–und Süßwarenwirtschaft 1990, pp. 135–138.

Primary Examiner—W. Gary Jones
Assistant Examiner—Laura E. Collins
Attorney, Agent, or Firm—Hopkins & Thomas

[57] ABSTRACT

A tempering and coating plant for different masses has at least one, preferably two subassemblies (3 or 8 respectively), consisting of a tempering machine (4 or 9 respectively) and a coating machine (5 or 10 respectively), arranged on the left and the right of a driven conveyor belt (1) for the articles to be coated, whereby the tempering machine or tempering machines (4, 9) are fixed in position, and the coating machine or coating machines (5, 10) are provided such that they can move transversely to the running direction of the conveyor belt (1). A connecting line (11) is provided between the tempering machine (4 or 9 respectively) and the coating machine (5 or 10 respectively) of each subassembly (3 or 8 respectively). A flow pipe (12) is located between each tank for the respective mass and the associated tempering machine and/or coating machine of each subassembly unit. A return pipe (13) can be provided between the coating machine (5 or 10 respectively) of each subassembly (3 or 8 respectively). Each connecting line (11) and each return line (13) has at least two pipe sections which are joined together via an articulated joint (14) and which have further articulated joints (14 or 15 respectively) at their ends so that the coating machine (5 or 10 respectively) can be moved transversly without uncoupling of the lines.

4 Claims, 3 Drawing Sheets

TEMPERING AND COATING PLANT FOR DIFFERENT MASSES, IN PARTICULAR FOR WHITE AND NON-WHITE CHOCOLATE

FIELD OF THE INVENTION

The invention refers to a tempering and coating plant for different masses, in particular for white and non-white chocolate, having at least one, preferably two subassemblies, consisting of a tempering machine and a coating machine, arranged on the left and the right of a driven conveyor belt for the articles to be coated, whereby the tempering machine or tempering machines are fixed in position, and the coating machine or coating machines are provided such that they can move transversely to the running direction of the conveyor belt, and having a connecting line provided between the tempering machine and the coating machine of each subassembly, a flow pipe between each tank for the respective mass and the associated tempering machine and/or coating machine of each subassembly, as well as a return pipe between the coating machine and the associated tank of each subassembly consisting of coating machine and tempering machine. Therefore, preferably two subassemblies are formed, whereby each subassembly has a coating machine and tempering machine. The tempering machine is fixed in position. The associated coating machine is provided such that it can move transversely to the running direction of the belt for the articles to be coated, something that can be realized with the coating machine mounted on rails or in a suspended state. Instead of employing the tempering and coating plant for white and non-white chocolate, it is of course also possible to process dark (plain) chocolate with the one subassembly while the other subassembly is provided for light (white) chocolate. Likewise, an application-related splitting between real chocolate in the one subassembly and, for example, fatty glazing in the other subassembly, is also possible. In doing this, mixing of these two masses is then also avoided. As fatty glaze need not be tempered, the tempering machine in the one subassembly can be omitted in this case because the coating machine concerned can be fed directly from the supply tank. The return pipe between the coating machine and the supply tank can also be omitted.

BACKGROUND OF THE INVENTION

A tempering and coating plant of the type described above is known from the journal "Zucker- und Süsswaren-Wirtschaft" (Sugar and confectionery industry), Issue 4, 1990, pp. 135-138. The two subassemblies are mounted to the left and right of the conveyor belt and the two coating machines can be employed in alternation. In doing this, the subassembly for white chocolate is not cleaned. The subassembly for non-white chocolate is either employed only for one type of non-white chocolate or, however, for example, in the case of alternate use for plain and for milk chocolate, rinsing or cleaning of the affected parts of the subassembly must be carried out. This can take place while the subassembly for white chocolate is in operation. The known subassemblies are equipped with rapid-action couplings, with respect to the chocolate lines, the use of which enables the lines to be uncoupled or, in the moved-in (operational) state, coupled respectively. These rapid-action couplings must at least be provided in the connecting line between the tempering machine and the coating machine and in the return line between the coating machine and the associated tank of each subassembly. The mechanical changing of the coating machine and the restarting of the respective tempering machine requires at least approx. 45 min. As the parts concerned are decoupled by means of the rapid-action couplings, it is also not possible to have the tempering machine in stand-by mode while the coating machine is in its moved-in state. Incidentally, the coupling and uncoupling of the rapid-action couplings involves chocolate losses.

Furthermore, a tempering and coating machine is known in which only a single subassembly consisting of one tempering machine and one coating machine is employed. If a change takes place here, then differing consequences result according to the particular succession of the various substances. With a change between dark chocolate and milk chocolate this can be done by simply changing the mass with subsequent rinsing. Mixing of smaller residue does not play any role here. However, with a change between milk chocolate or dark chocolate and white chocolate, extensive cleaning of the subassembly, including the lines, is necessary. The is carried out by carefully washing the coating machine and the tempering machine, something that demands time and a break in production lasting several hours. In order that such a subassembly can be cleaned in such a washing procedure, all parts which come into contact with the chocolate must be manufactured from stainless steel. The necessary wet cleaning with hot water increases the risk of biological contamination, especially the danger from salmonella. As chocolate masses normally contain less than 1% moisture, there would seem to be no danger from salmonellae, i.e. from the point of view of the mass itself. It is only the wet cleaning or cleaning water residue respectively which increases the danger from salmonellae.

SUMMARY OF THE INVENTION

It is the object of the invention to make available a tempering and coating machine of the type described above which renders possible a rapid change of mass.

According to the invention, this is achieved in that each connecting line and each return line has at least two pipe sections which are joined together via an articulated joint and which have further articulated joints at their ends so that the coating machines can be moved transversely without the lines uncoupling. The two circuits of the two subassemblies—in particular the two tempering circuits if two subassemblies, each with coating machine and tempering machine—thus remain fully functional at all times, i.e. while one subassembly is still in operation, for example, if articles are being coated with plain chocolate by means of the associated coating machine, the other subassembly can already be started up with white chocolate, whereby circulation of the mass from the associated tank, via the the associated tempering machine, into the associated coating machine, which is not yet in its operating position, and back again to the tank takes place so that the white chocolate is already in a tempered state. The run-up time for changing the mass, normal up until now, is omitted. Changing the mass still requires the coating machine of one subassembly to be moved outwards from its operating position and the coating machine of the other subassembly to be moved towards the conveyor belt into its operating position. A time period of approx. 5 min is sufficient for this change-over of the two coating machines. There is no risk of contamination because a washing procedure does not take place. For this reason there is no requirement to use non-corroding materials for the individual parts of the subassemblies. Another advantage is that the chocolate loss upon uncoupling and coupling the lines no longer occurs, something that was unavoidable up until now. A change of mass at the tempering and coating plant can be easily carried by the plant operating personnel. The use of special mechanics and electricians is no longer necessary. Mixing of the dark and white chocolate does not happen. If a change of, for example, plain chocolate to milk chocolate or vice versa, is to be carried out in the one subassembly which is provided for non-white chocolate, this can be achieved through a simple rinsing process which is controlled in such a way that only a small amount of mixing of the two masses occurs, without having any significant effect.

In another case, one subassembly, consisting of tempering machine and coating machine, can be employed for chocolate and a second subassembly, consisting of coating machine alone, can be used for fatty glazing. The tempering is omitted from the second subassembly; the return line to the tank can also be omitted.

However, there is also an application possible in which only one single subassembly, consisting of tempering machine and coating machine, is provided. Hence, products with and without coatings can be alternately produced in a plant. During the production of uncoated products, the coating machine is moved away from the plant for reasons of hygiene. The free space resulting in the plant is closed by a conveyor belt. Articulated joint is understood to mean any type of flexible coupling which does not require mechanical separation of pipelines but nevertheless permits the movement of the coating machine. Several possibilities of realizing articulated joints are available from specialists, for example, in the form of opposed, rotatable flanges, as bellows, as tubes made from flexible material, for example, plastic.

The two pipe sections facing each other can have an included angle of <180° with each other in all positions. In particular, the angle can lie in the order of magnitude of 90°, whereby one pipe section can be arranged approximately parallel to the running direction.

There is the possibility of amalgamating the connecting line and the return line of each subassembly into a docking unit for each subassembly. These two docking units are then arranged to the left and right of the conveyor belt, in fact in an area which lies roughly between the tempering machine and the associated coating machine. This form of arrangement has the advantage that the length of the lines is comparatively short and the number of articulated joints is comparatively few. The docking unit itself needs to be arranged or suspended respectively, and so that it may move, at corresponding dimensions.

On the other hand it is possible to amalgamate the two connecting lines and the two return lines of the two subassemblies at a common coupling unit. This common docking unit can be mounted fixed in position. The length of the lines is increased a little through this. However, there is no substantial disadvantage. In particular, there ensues the possibility of locating the common docking unit centrally above the conveyor belt, i.e. at a point where there is in most cases sufficient space available anyway.

BRIEF DESCRIPTION OF THE DRAWINGS

The invention will be further explained and described by means of preferred embodiment examples which are illustrated in the drawings. The drawings show.

DETAILED DESCRIPTION

Figure 1:
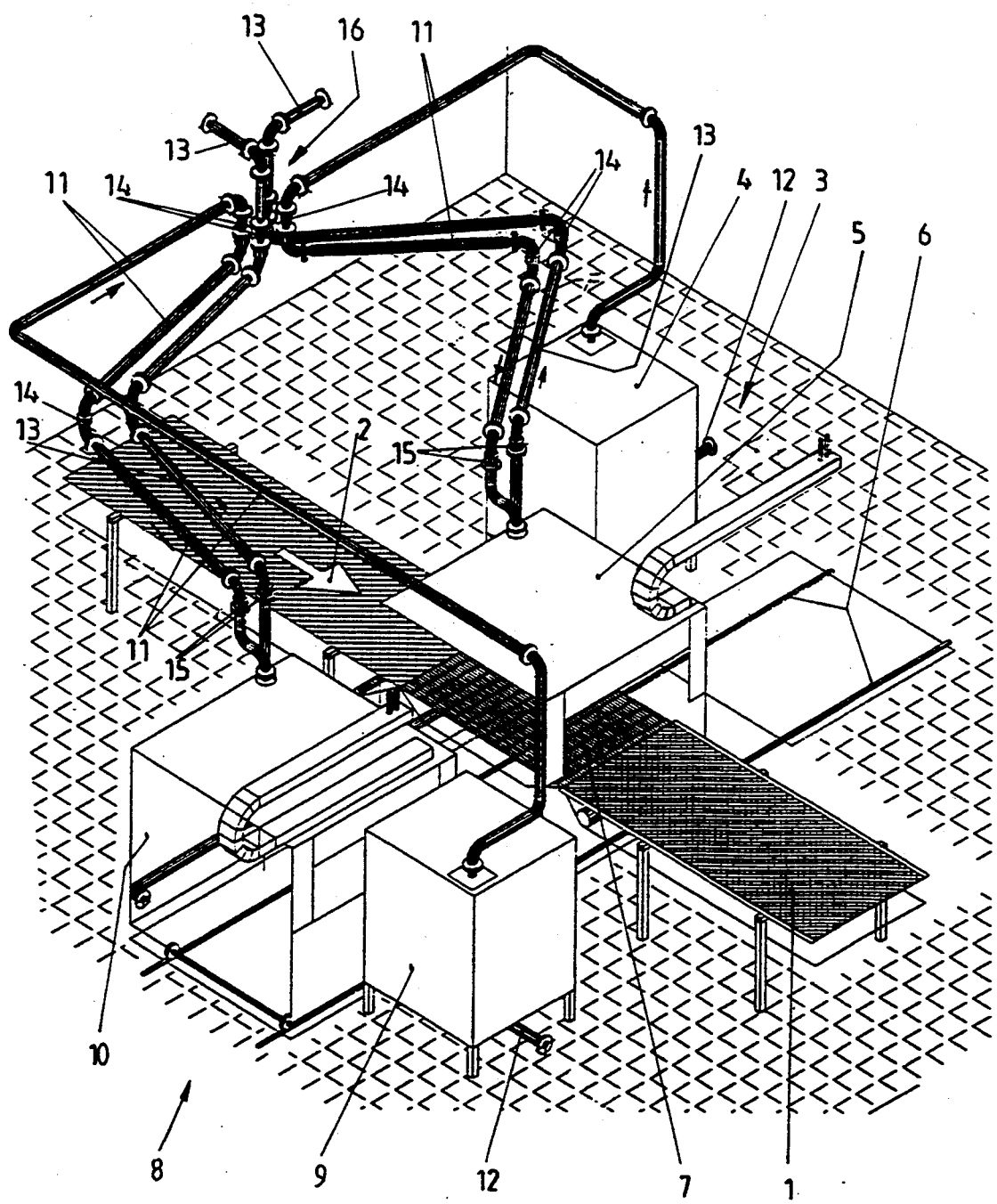
FIG. 1 a perspective view of a first embodiment version of the tempering and coating plant, FIG. 2 a schematic plan view of a second embodiment version of the tempering and coating plant, FIG. 3 the illustration of an articulated joint, and FIG. 4 a pipe bend with articulated joint.

FIG. 1 shows a conveyor belt 1, the running direction of which is indicated by an arrow 2. The articles to be coated are located on the conveyor belt 1; however, said articles are not illustrated for the sake of clarity. A subassembly 3, essentially comprising a tempering machine 4 and a coating machine 5, is illustrated on the left-hand side of conveyor belt 1. The tempering machine 4 is fixed in position, while the coating machine 5 can be moved on rails 6 transversely to the running direction of conveyor belt 1. The coating machine 5 is illustrated moved inwards into its operating position. Therefore, it is located, with its device for forming a thin curtain, above conveyor belt 1 and with all other main parts below conveyor belt 1 which in this area is formed by a permeable grating belt 7. The subassembly 3 might be provided or destined respectively for white chocolate.

Also located on the right-hand side of conveyor belt 1 is a subassembly 8 which here again comrises a tempering machine 9 and a coating machine 10. Tempering machine 9 is also fixed in position. The coating machine 10 is in the position moved away from the conveyor belt because coating machine 5 in subassembly 3 is moved into its operating position. The subassembly 8 might be provided for dark and for mixed chocolate.

There is a series of other components within each subassembly 3 and 8 which will be described jointly here although each is provided twice and hence separately. A connecting line 11, which can comprise several pipe sections, leads from the tempering machine 4 to the coating machine 5. The tempering machine 9 and the coating machine 10 are also linked to each other via a second connecting line 11. Each subassembly also includes a tank, which can be heated, for the type of chocolate concerned; said tank is not illustrated here for sake of clarity. A flow pipe 12 leads from each tank to the respective tempering machine 4 or 9 respectively. As the two tempering machines 4 and 9 are fixed in position, the two flow pipes 12 can also be provided as lines laid fixed in position. For sake of clarity, they are only illustrated here inasmuch as the respective connection at the respective tempering machine is illustrated. Furthermore, there are return lines 13 which lead from coating machine 5 to the associated tank and from coating machine 10 to the associated tank respectively. Articulated joints 14 and 15 are provided in order to permit the movement of the pipe sections of the connecting lines 11 and the return lines 13. The articulated joints 14 and 15 are built very similar and comparable to each other. However, with articulated joints 14, the axes of the two connected pipe sections are roughly parallel or in parallel plane respectively to each other, while with articulated joints 15, a more right-angled configuration is produced. The connecting lines 11 and the return lines 13 are made so flexible by means of the articulated joints 14 and 15 that these lines can follow the respective movement of the respective coating machine 5 or 10 respectively, thus avoiding an uncoupling upon changing the mass. By amalgamating four articulated joints 14 roughly in a vertical, central, longitudinal plane above conveyor belt 1, a common docking unit 16 is created at which the articulated joints 14 concerned can be suspended fixed in position. The part of the connecting lines 13 from the respective tempering machine 4 or 9 respectively to the common coupling unit 14 does not need to include an articulated joint because the tempering machines 4 and 9, and also the common docking unit 16, are provided fixed in position so that lines also fixed in position may be laid between these two points.

Figure 2:
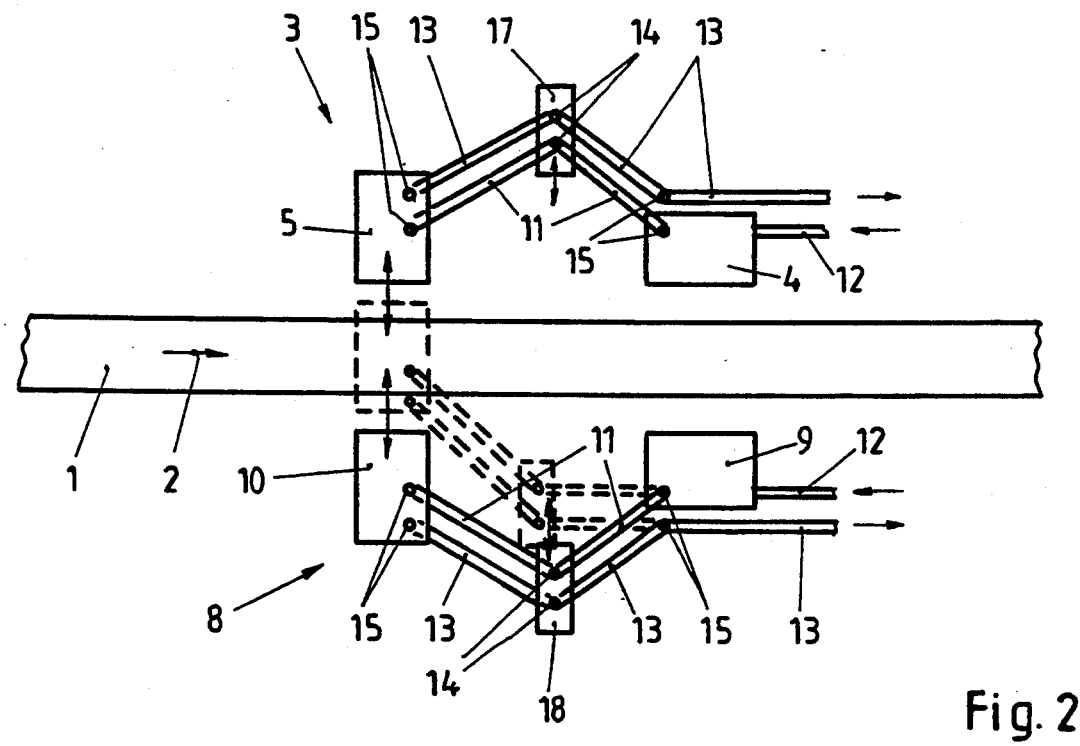

FIG. 2 shows an approximate schematic view in which, however, agreeing with the embodiment version according to FIG. 1, a left-hand subassembly 3 and a right-hand subassembly 8 are provided relative to conveyor belt 1. However, in this case no common docking unit 16 is formed but instead, each subassembly 3 or 8 respectively has a separate coupling unit 17 or 18 respectively. Arrows indicate that here the coupling units 17 and 18 can also be moved slightly transversely to the running direction of conveyor belt 1 according to arrow 2. The connecting line 11 in this case consists of only two pipe sections apart from the connecting pipes at the tempering machine and the coating machine. Consequently, only a single articulated joint 14 is provided within connecting line 11. An articulated joint 15 is located on both the tempering machine 4 side and the coating machine 5 side. The same is true for the other subassembly 8.

Figure 3:
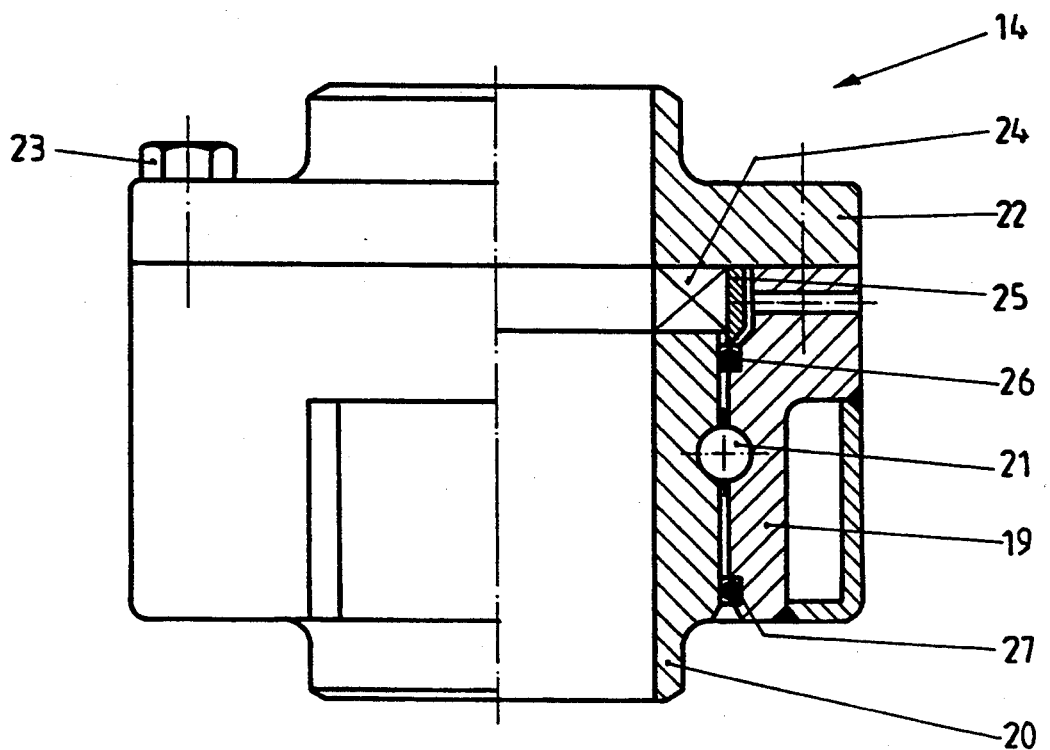

FIG. 3 shows the main individual parts of an articulated joint 14 or 15 respectively. The type of articulated joint results from the type of the adjoining pipe sections, in fact according to whether it is a straight pipe section or a 90° bend. The articulated joint 14 has a housing 19 in which a barrel nipple 20, connected to one pipe section, is mounted with the aid of balls 21 so that it may turn. A flange 22 is joined via screws 23 to the housing 19, whereby the other pipe section joins onto flange 22. A seal 24, which can have a bearing ring 25 allocated to it, is located between flange 22 and barrel nipple 20. Sealing rings 26 and 27 are provided between barrel nipple 20 and housing 19. Such articulated joints 14 are actually known in other technical fields.

Figure 4:
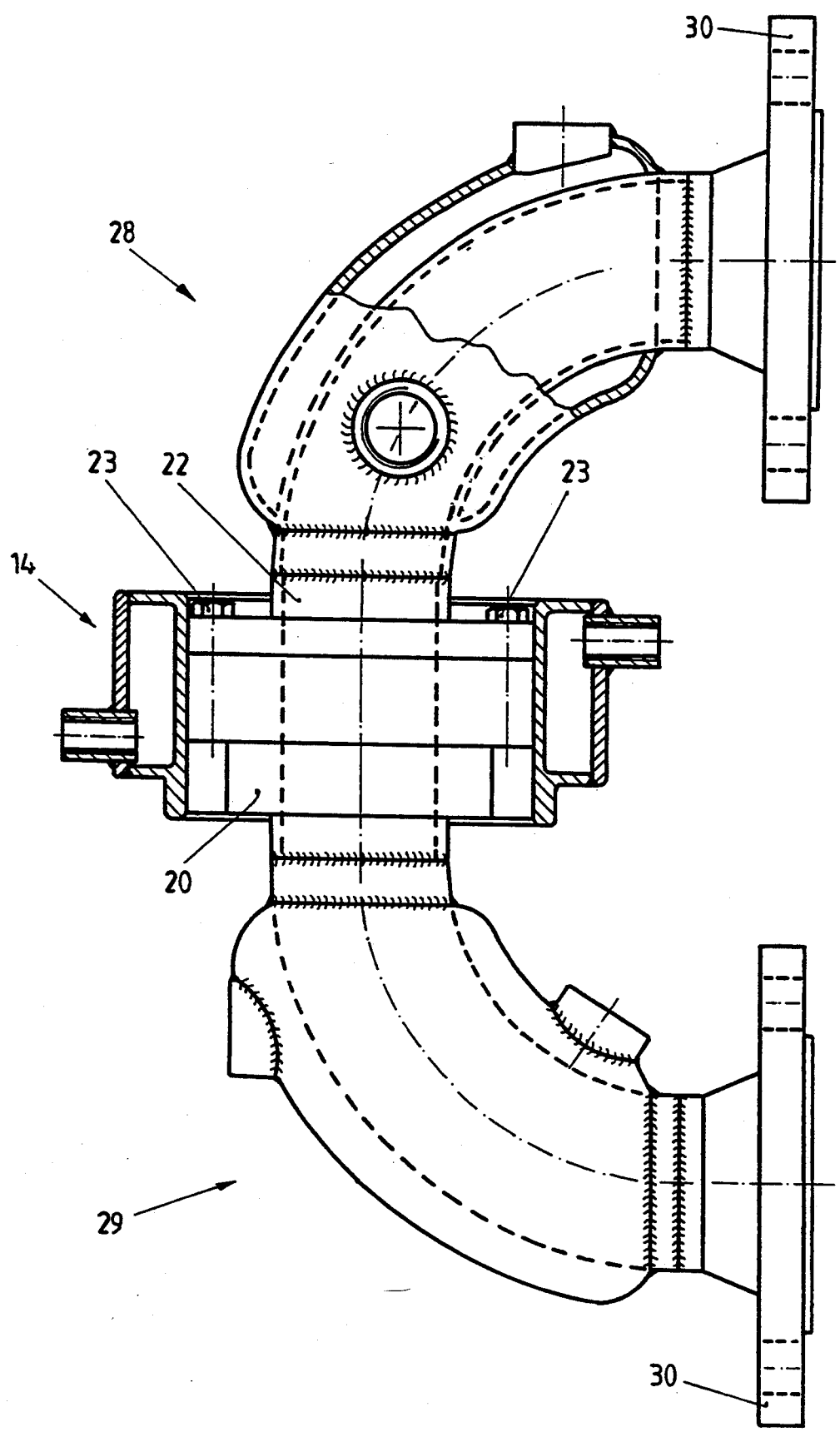

FIG. 4 shows a complete articulated joint 14 with two adjoining pipe bends 28 and 29, each of which ends in a flange 30 onto which the pipe sections of connecting lines 11 and return lines 13 are joined with the aid of corresponding mating flanges. As can be seen, both pipe bends 28 and 29 as well as articulated joint 14 are constructed with double walls so that a heating circuit can be connected here in order to control or keep constant respectively the temperature of the chocolate mass.

While a detailed description has been provided to show the preferred embodiments of the invention, it will be understood by those skilled in the art that variations and modifications thereof can be made without departing from the spirit and scope of the invention as set forth in the following claims.

LEGEND FOR DRAWINGS

1=Conveyor belt
2=Arrow
3=Subassembly
4=Tempering machine
5=Coating machine
6=Rail
7=Grating belt
8=Subassembly
9=Tempering machine
10=Coating machine
11=Connecting line
12=Flow pipe
13=Return pipe
14=Articulated joint
15=Articulated joint
16=Docking unit
17=Docking unit
18=Docking unit
19=Housing
20=Barrel nipple
21=Balls
22=Flange
23=Screws
24=Seal
25=Bearing ring
26=Sealing ring
27=Sealing ring
28=Pipe bend
29=Pipe bend
30=Flange

I claim:

1. A tempering and coating plant for tempering and coating white and non-white chocolate masses, comprising a conveyor having a driven conveyor belt, at least one subassembly (3, 8), having a tempering machine (4, 9) and a coating machine (5, 10) positioned along said driven conveyor belt (1) for coating chocolate mass moving on the conveyor belt, said tempering machine being fixed in position with respect to said conveyor and said coating machine being movable transversely with respect to the running direction of the conveyor belt, a connecting line (11), extending between said tempering machine (4) and said coating machine (5) of said subassembly (3) and arranged to deliver chocolate mass from said tempering machine to said coating machine, and a return line extending from said coating machine (5) for connection to a tank of said subassembly, said connecting line (11) and said return line (13) each amalgamated at a docking unit and each having at least two pipe sections connected via an articulated joint (14) and having articulated joints at their ends to enable said connecting line and said return line to be moved transversely with said coating machine.

2. Tempering and coating plant according to claim 1, wherein the at least two pipe sections are disposed at an angle of <180° from each other.

3. Tempering and coating plant for white and non-white chocolate comprising a conveyor belt for conveying chocolate, a plurality of subassemblies each having a tempering machine mounted in a fixed position adjacent the conveyor belt, a coating machine mounted adjacent the conveyor belt and said coating machine being movable transversely with respect to the running direction of the conveyor belt, a connecting line extending between said tempering machine and said coating machine of each subassembly to deliver chocolate from said tempering machine to said coating machine, and a return line extending from said coating machine for Connecting to a tank of each subassembly, with connecting lines and return lines of said subassemblies amalgamated at a common coupling unit and each including a series of pipe sections connected at one end by articulated joints and having articulated joints at their other ends attached to each coating machine to enable said connecting lines and said return lines to move with each coating machine as each coating machine is moved with respect to the running direction of the conveyor belt.

4. Tempering and coating plant according to claim 3, wherein said common coupling unit is located approximately in the center above the conveyor belt.

* * * * *